United States Patent [19]

Kakii et al.

[11] Patent Number: 4,737,009
[45] Date of Patent: Apr. 12, 1988

[54] INDEPENDENT OPTICAL FERRULE AND OPTICAL FIBER CONNECTOR WHICH USES THE FERRULE AND REPLACEABLE OPTICAL PLUG USING THE FERRULE

[75] Inventors: Toshiaki Kakii; Naoshi Hakamata; Yasuo Asano; Shuzo Suzuki, all of Kanagawa, Japan

[73] Assignee: Sumitomo Electric Industries, Ltd., Osaka, Japan

[21] Appl. No.: 871,036

[22] Filed: Jun. 5, 1986

[30] Foreign Application Priority Data

Jun. 13, 1985 [JP] Japan .................. 60-128952

[51] Int. Cl.⁴ .............................................. G02B 6/36
[52] U.S. Cl. .................. 350/96.20; 350/96.21
[58] Field of Search ............. 350/96.20, 96.21, 96.22

[56] References Cited

U.S. PATENT DOCUMENTS 4,090,778  5/1978  Phillips et al. ............... 350/96.20
4,362,360  12/1982  Mannschke .................. 350/96.2

FOREIGN PATENT DOCUMENTS 0096511  12/1983  European Pat. Off. .
0138052  4/1985  European Pat. Off. .
0060715  4/1983  Japan ......................... 350/96.2
1448742  10/1976  United Kingdom .
1456395  11/1976  United Kingdom .
2014753  8/1979  United Kingdom .
1556505  11/1979  United Kingdom .
1566929  5/1980  United Kingdom .
1579455  11/1980  United Kingdom .
1585766  3/1981  United Kingdom .
1589725  5/1981  United Kingdom .
1593559  7/1981  United Kingdom .
1596227  8/1981  United Kingdom .
1596388  8/1981  United Kingdom .
1600010  10/1981  United Kingdom .

Primary Examiner—John Lee
Assistant Examiner—John Ngo
Attorney, Agent, or Firm—Sughrue, Mion, Zinn, Macpeak, and Seas

[57] ABSTRACT

Disclosed herein is an independent optical ferrule, an optical connector employing the independent ferrule, and replaceable plug unit employing the independent ferrule. Also disclosed is a method of using the replaceable plug unit employing the independent ferrule. The independent ferrule includes a stem portion having both ends each confronting ones of optical elements such as an end ferrule. The independent ferrule further includes at least one optical fiber held in a fixed position in the stem and having the both ends flush with the end faces of the stem. The independent ferrule also includes a collar adapted to serve as positioning member upon assembly of said independent ferrule into the optical connector or the replaceable plug unit.

33 Claims, 4 Drawing Sheets

INDEPENDENT OPTICAL FERRULE AND OPTICAL FIBER CONNECTOR WHICH USES THE FERRULE AND REPLACEABLE OPTICAL PLUG USING THE FERRULE

BACKGROUND OF THE INVENTION

The present invention relates to an independent optical ferrule and optical fiber connector which uses the independent ferrule. The present invention further relates to a replaceable optical plug which uses such ferrule. The "optical ferrule" referred herein implies a member which embeds therein a single or a plurality of optical fibers and position such fiber or fibers in fixed state. The present invention also relates to a method for using such replaceable optical plug for the connection between optical fiber ends or for the connection between the optical fiber end and an light input portion of an optical system or equipment.

FIG. 1(a) shows a conventional optical fiber connector serving as a plug in which single optical fiber connection is attained. In FIG. 1(a), the connector is provided with a ferrule 2 which is produced with high production accuracy to which one end of a coated optical fiber 8 is connected. FIG. 1(b) shows an adaptor housing 9 having a sleeve 10 which functions to align the ferrule of the plug with the axis of another ferrule having the identical configuration of the plug ferrule, when the plugs are inserted into the adaptor housing 9 to provide surface contact between the ends of the two ferrules 2 and 2. The sleeves is adapted to maintain this axial alignment and hold these ferrules in a fixed position.

In FIG. 1(a), a terminal or end ferrule 2 is secured in a plug housing. A coating layer of a coated optical fiber 8 is removed at the end portion thereof to provide a bare optical fiber. The bare fiber is joined to one end of the end ferrule 2 in such a manner that the end face of the bare optical fiber is in alignment with the end face of one end of the ferrule 2. The end ferrule 2 is secured in an internal space of the housing defined by the combination of a push ring member 3 and an insertion guide 5 upon their assembly, and is normally urged by a spring 7 abutting a collar portion S of the terminal ferrule 2.

The insertion guide 5 is formed with a bore in which the terminal ferrule 2 is disposed. Annular stop member 41 is provided in the bore to which the collar portion S abuts. The coated optical fiber 8 extends through a hole of the push ring member 3, while the other end portion of the terminal ferrule extends through the bore of the insertion guide 5 and projects from the open end of the guide 5. The ferrule is normally held in position receiving the biasing force of the spring 7.

The optical fiber connector thus constructed is connected to one end of the sleeve 10 of the adaptor housing 9 and another identical optical fiber connector is connected to the other end of the sleeve 10, so that two connectors confront each other to thus provide an optical connection. A lock nut 6 loosely disposed around the insertion guide 5 is then threadingly engaged with a thread 42 formed on an outer peripheral surface of the adaptor housing 9. As a result, an optical connection line is finally provided.

There is however, a problem such that damage of the end surface of the terminal ferrule 2 causes a loss in optical coupling. Therefore, protection of the end surface of the end ferrule 2 is one of the most important technical problems in the optical fiber connector. To solve this problem, there has been proposed a method of polishing the end surface of the bare glass fiber embedded in the end ferrule 2 in a concave shape. Alternatively, there has been another proposal to provide coating at the end surface of the ferrule 2. In any of these methods, however, it is impossible to completely avoid the damage of the end surface of the ferrule, if connecting and removal operations are repeatedly and frequently conducted. Particularly, if the connectors are coupled to each other through the adaptor together with foreign materials or the like between the ferrule ends, the end surfaces are severely injured.

In spite of the fact that the end surface of the optical fiber connector is such an important part that may determine the optical coupling property, the end surface could not be protected sufficiently, due to the necessity of connecting and removing operations of the connector. In reality, in case the end surface of the terminal ferrule is injured, the damaged portion is cut off after disassembly of the plug, and then reassemble the same. In this case, it takes much time for such disassembly and assembly work of the terminal ferrule as well as connector housing. For example, it takes not less than 20 to 30 minutes for the entire process, such as joining the optical fiber with terminal ferrule end, polishing the end of the ferrule, i.e., the end of the optical fiber embedded in the ferrule, assembling the optical fiber connector, etc. Moreover, setting aside the case where the work is carried out indoors in a good surrounding, it is very difficult to carry out the work outdoors in the surroundings where operators suffer from severe wind and rain. Further, according to the above mentioned ferrule reattaching work, the ferrule is reused. However, if the ferrule end is damaged too much, the ferrule should be cut off at the portion joining with the external optical fiber. In this case, there occurs a further problem that the length of the optical fiber becomes correspondingly short, and the reattaching of the ferrule per se might become impossible due to the shortage of the length of the optical fiber. For example, if the optical fiber is installed inside of a wall of a building, there is no spare length if a new terminal ferrule is joined to the optical fiber, since several lengths of the optical fiber is consumed by the cutting and rejoining work.

SUMMARY OF THE INVENTION

It is therefore, an object of the present invention to overcome the above-mentioned drawbacks and disadvantages, and to provide an improved optical fiber connector.

Another object of this invention is to provide an independent optical ferrule capable of providing such improved optical fiber connector.

Still another object of the invention is to provide such independent optical ferrule and optical fiber connector capable of providing prompt re-operation of the optical connector even if the ferrule end is injured.

Still another object of the invention is to provide a replaceable optical plug incorporating therein the above mentioned independent optical ferrule.

Still another object of the invention is to provide such replaceable optical plug capable of providing prompt re-optical connection between the optical fiber cable or between optical fiber and optical equipment.

Still another object of the invention is to provide a method of using such replaceable optical plug.

These and other objects of the present invention will be attained by providing an independent optical fiber ferrule which has both longitudinal ends serving as optical connections to other optical elements such as end ferrule. The independent optical fiber ferrule embeds therein an optical fiber or a plurality of optical fibers and maintains and holds the fiber(s) in a given position. The end surfaces of the independent ferrule are free from mechnically integral connection with other optical elements.

Further, in the present invention, an optical fiber connector includes the above-mentioned independent ferrule. The independent ferrule is detachably supported in a housing of the optical fiber connector. One end surface of the independent ferrule is in surface contact with one end of an end ferrule secured in the housing. The end ferrule has its other end mechanically integral with one end of an optical element such as an optical fiber. The other end surface of the independent ferrule provides surface contact with a ferrule of another optical connector at an adaptor member.

Furthermore, in the present invention, a replaceable plug unit is provided which incorporates therein the independent ferrule. The plug unit is used between optical connectors through an adaptor, or between the other optical connector and an optical equipment or apparatus through a receptacle.

BRIEF DESCRIPTION OF THE DRAWINGS

In the drawings;

FIGS. 1(a) and 1(b) show a conventional optical fiber connector, in which FIG. 1(a) is a partial cross-sectional view showing an optical fiber connecting plug, and FIG. 1(b) is a partial cross-sectional view showing an adaptor housing having a sleeve;

FIGS. 2(a) and 2(b) show an optical fiber connector according to the present invention, in which FIG. 2(a) is a partial cross-sectional view of an optical fiber connecting plug, and FIG. 2(b) is a partial cross-sectional view of an adaptor housing having a sleeve;

DETAILED DESCRIPTION OF THE PREFERRED EMBODIMENTS

Figure 1A:
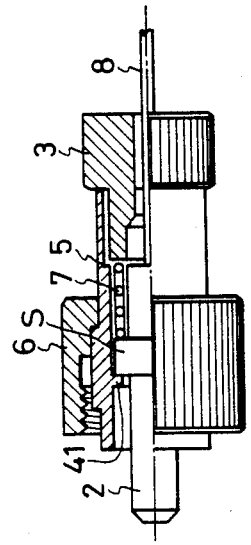
Figure 1B:
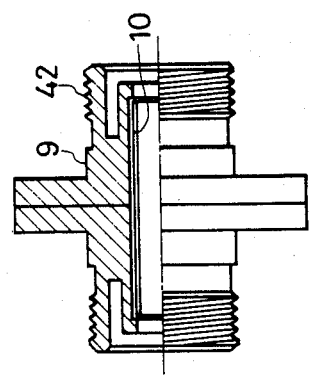

The present invention will be described with reference to accompanying drawings. In the drawings, like parts and components are designated by the same reference numerals and charactors as those shown in FIGS. 1(a) and 1(b).

Figure 2A:
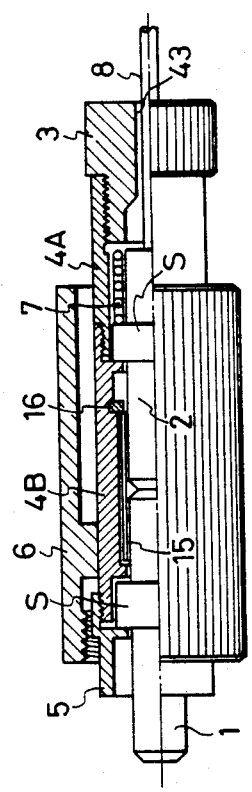
Figure 2B:
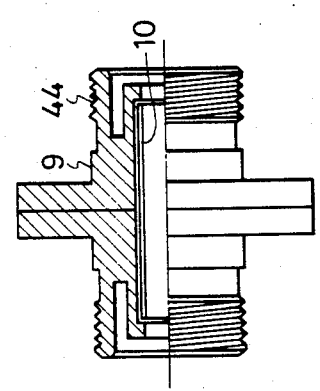

A first embodiment of an optical fiber connector is shown in FIGS. 2(a) and 2(b). As shown in FIG. 2(a), an end ferrule 2 and an independent ferrule 1 are housed in a housing defined by a cylindrical press ring 3, intermediate rings 4A and 4B and an insertion guide 5. The cylindrical press ring 3 is formed with a central bore 43 which allows passing of an external coated optical fiber which is connected to one end of the end ferrule 2. The intermediate rings 4A and 4B are disposed between the press ring 3 and the insertion guide 5. The press ring is threadingly engaged with the first intermediate ring 4B, and the intermediate rings are threadingly engaged together. Further, the guide ring 5 is threadingly engaged with the second intermediate ring 4B. The other end of the end ferrule 2 is in surface contact with one end of the independent ferrule 1 maintaining axial alignment with each other.

A sleeve 15 is disposed at inside of the second intermediate ring 4B, and an annular stop member 16 is disposed inside of the ring 4B. A spring 7 is provided between the press ring 3 and a collar portion S of the end ferrule 2. These ferrules 2 and 1 are supported by the sleeve 15 and the independent ferrule 1 is also supported by the insertion guide 5 whose one end abuts a collar S of the independent ferrule 1. A clamping nut 6 is provided over the intermediate rings 4A and 4B and the insertion guide 5. The clamping nut 6 is loosely supported thereover and is threadingly engaged with a thread 44 of an adaptor housing 9.

The end ferrule 2 has one end connected to the end of the coated optical fiber 8. The end ferrule 2 embeds therein a bare glass fiber. At the end portion of the coated optical fiber 8, a coating layer is removed to expose bare glass fiber. End suraces of the end ferrule 2 and the bare glass fiber of the coated optical fiber are polished and are joined together by, for example, adhesive agent to provide an integral structure. The end ferrule 2 has the other end in surface contact with one end of the independent ferrule 1.

The independent ferrule 1 according to the present invention performs optical connecton at both longitudinal ends, and embeds and holds an optical fiber therein in a predetermined position. Both ends of the independent ferrule 1 are free from mechanical joining with the optical fiber, contrary to the end ferrule 2.

Figure 3:
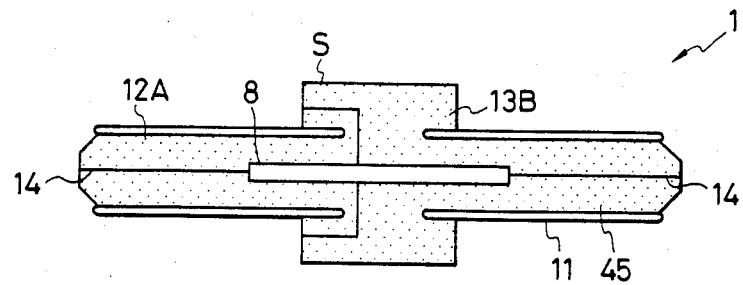
FIG. 3 is a cross-sectional view showing one embodiment of an independent optical ferrule according to the present invention.
Figure 4:
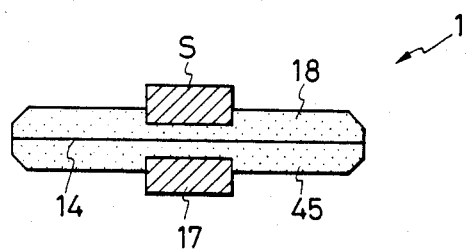
FIG. 4 is a cross-sectional view showing a second embodiment of an independent optical ferrule according to the present invention.

Examples of independent optical ferrules 1 are shown in FIGS. 3 and 4. In FIG. 3, the coating is removed at both end portions of the coated optical fiber 8, so that plannar ends of the independent ferrule 1 expose ends of bare glass fibers 14. Metal pipes 11 are formed over stem portions 45 of the independent ferrule 1, and a collar portion S is provided at a longitudinal center portion. For the manufacture, the two metal pipes 11 and bare glass fiber portions 14 are put in a mold, and then resin members 12A and 13A are injected into the mold to form the collar portion. The end surfaces of the respective bare glass fiber portions 14 and the associated end surfaces of the ferrule are flush with each other, and then polished. In this embodiment, resin materials between the portions 12A and 13B are different from each other.

FIG. 4 shows another embodiment of the independent ferrule 1 in accordance with the present invention. In this embodiment, a bare glass fiber 14 extends through a length of the independent ferrule. A collar portion S is constituted by a metal ring 17, and a stem portion 45 for holding the bare glass fiber 14 is constituted by a ceramic member 18. The independent ferrule 1 may be of such a metal-ceramic combination type. However, of course, the ferrule may be made of only a ceramic material, for example, zirconia as a whole. Further in the embodiments shown in FIGS. 3 and 5, the collar S is positioned at the longitudinal center portion of the ferrule 1. However, the position of the collar S is not necessarily centrally positioned in accordance with various kinds of requirements.

Next, the assembly of the optical fiber connector will be described with reference to FIGS. 2(a) and 2(b). The coated optical fiber 8 fixedly connected to one end of the end ferrule 2 is beforehand passed through the push ring 3 and the spring 7, and the end ferrule 2 is fixed by the intermediate ring 4A. Thereafter, the other end of the end ferrule 2 and one end of the independent ferrule 1 are in surface contact with each other by the engagement between the insertion guide 5 and the second intermediate ring 5. Axial alignment between the end ferrule 2 and the independent ferrule 1 is ensured by the sleeve member 15.

Upon assembly, the end ferrule 2 and the independent ferrule 1 are both held in a stabilized position because of the abutments of the collar portions S and S of these ferrules with the intermediate rings and insertion guide 5, respectively, so that these ferrules are housed in the plug housing.

FIG. 2(b) shows an adaptor housing 9 having a sleeve 10 adapted to be coupled to the plug. The inner diameter of the adaptor sleeve 10 is approximately equal to or slightly larger than the outer diameter of the stem portion of the independent ferrrule 1. The stem portion of the independent ferrule projecting outwardly from the open ends of the insertion guide 5 is inserted into one end opening of the sleeve 10 of the adaptor housing 9. Another optical connector having the construction identical with the above-mentioned connecting plug is also inserted into the other end opening of the sleeve 10 to the extent that both planar ends of ferrules are brought into suraface contact with each other within the sleeve 10, to thereby provide an optical connection between the optical fiber 8 and another optical fiber or optical equipment. Thereafter, the clamping nut 6 is engaged with the adaptor housing 9 to thereby complete the optical connection.

It is apparent from the above description that the end ferrule 2 and the independent ferrule 1 are connected to each other within the sleeve 15 in the optical fiber connector housing, and that the connecton between a pair of optical fiber connectors are made through the individual independent ferrule 1, so that the connection is made by three coupling portions, while a conventional connection is made through one coupling portion. That is, in the present invention, respective end ferrules of the respective plugs and the independent ferrule provide three coupling portions, whereas in the conventional coupling, the coupling is made at confronting end ferrules of the respective plugs. Thus, the end surface of the end ferrule 2 is protected by the independent ferrule 1 in the present invention, and only the end surface of the independent ferrule 1 may be injured by the repetition of connecting and disconnecting operations, since only the independent ferrule 1 serves direct interconnection with the opposing ferrule. Accordingly, the optical coupling property can be restored to the original state only by replacing the independent ferrule 2 whose ends are free from mechanical interconnection such as adhesion to the optical fiber.

It is apparent from the drawings that the independent ferrule 1 is replaceable. Generally, the replacement of the independent ferrule 1 is carried out by the steps of disassembling the optical fiber connector plug housing in the order reverse to the above-described assembling procedure. Thereafter, a damaged independent ferrule is removed, and a new independent ferrule 1 is set in the sleeve, and the housing is again assembled. Accordingly, conventional troublesome steps are not required such as adhereing step and polishing step. That is, the independent ferrule 1 can be easily and readily replaced.

In FIG. 2(a), the independent ferrule 1 can be replaced whenever the insertion guide 5 is taken off, and only the independent ferrule is replaced. However, the present invention is also applicable to the case where the independent ferrule is housed in a replacable unit, and if the independent ferrule is injured, the replaceable unit per se is replaced by a new one so as to more easily replace the ferrule without disassembling the optical fiber connecting housing. Such structure will be described later.

Further, if necessary, a rotation preventive member for preventing the end ferrule 2 and the independent ferrule from rotation can be provided as a matter of design, though not shown in the drawings. According to the embodiment shown in FIGS. 2(a) and 2(b), the collar S of the ferrule 1 is in surface contact with the internal end face of the intermediate ring 4B, where the surface contact portions have irregular shapes to prevent the ferrule 1 from rotation relative to the intermediate ring.

Figure 9A:
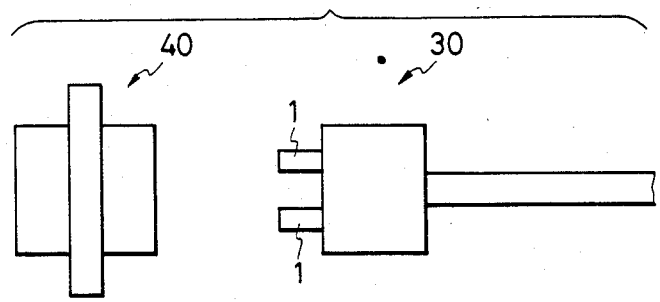
FIG. 9(a) is a schematic illustration showing an optical fiber connecting plug and adaptor, wherein two independent optical ferrules are used to provide optical interconnection with respect to two optical fibers.
Figure 9B:
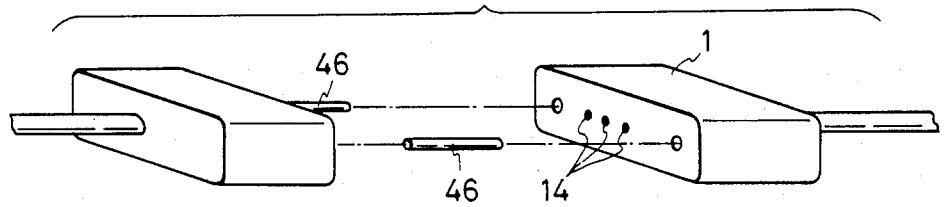
FIG. 9(b) is a schematic illustration showing an independent ferrule and an opposing ferrule, wherein a plurality of optical fibers are embedded.

Furthermore, although the present invention has been described with reference to the single optical fiber line, the invention is applicable to multiple optical fibers connection. For example, as shown in FIG. 9(b), a multiple collective type independent ferrule may be connected to a multiple collective fiber type ferrule, so that the independent ferrule can be replaced collectively in case of damage. In this case, a pair of guide rods 46 are used to obtain accurate alignment between respective multiple fibers. Alternatively, as shown in FIG. 9(a), a plurality of independent ferrules may be provided with respect to multiple optical fibers. In this case, only a injured independent ferrule need be replaced by a new one.

Further, the intermediate ring as shown in FIG. 2(a) may be arranged so as to be disassembled into a plurality of parts 4A and 4B, so that the insertion guide 5 can be fixed to the end ferrule 2 after the removal of the independent ferrule and that the end ferrule 2 can be directly inserted in the adaptor housing 9. More specifically, one of the intermediate rings 4B is removed, and the insertion guide 5 is fixed to the tip end of the other intermediate ring 4A.

While the above-mentioned embodiments have been described with respect to the case where a fiber to fiber connection is contemplated, the present invention is also applicable to the case where an optical fiber to optical equipment connection is contemplated. In the latter case, instead of the employment of the adaptor mentioned above, a receptacle is provided at an optical input end of an optical device such as photo-electric element for performing photo-electric conversion, and one end of the independent ferrule is connected to the stationary portion such as the receptacle, while the other end of the independent ferrule is connected to the end ferrule having its other end connected to the optical fiber. In this case, the present invention can provide the same effect as above.

Next, an explanation is made with respect to a replaceable plug incorporating therein the above-mentioned independent ferrule. Thus replaceable plug is replaced by a new one if the end portion of the independent ferrule housed therein is injured.

Figure 5:
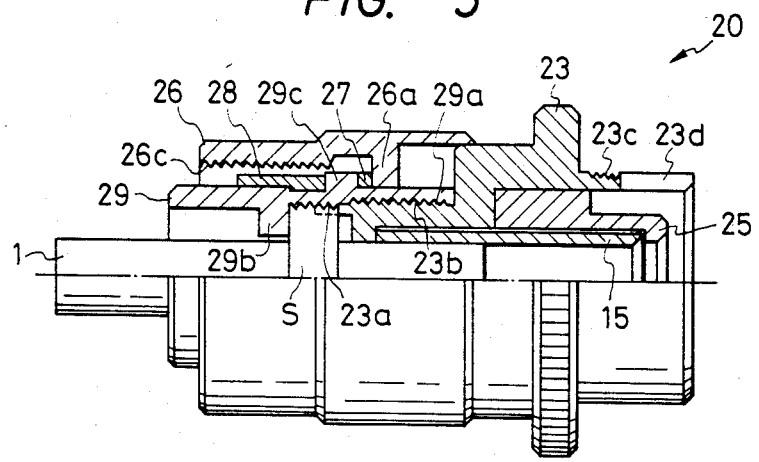
FIG. 5 is a partial cross-sectional view showing a replaceable optical plug according to the present invention.

FIG. 5 shows a cross-sectional view of a replaceable plug according to the present invention. The plug 20 is basically includes an independent ferrule 1 embedding therein an optical fiber, a sleeve 15 and a plug housing, housing therein the ferrule and the sleeve. As shown in FIG. 5, the replaceable plug can be coupled to an optical connector plug disposed at the end of the external optical fiber, or also coupled to an adaptor or receptacle. That is, in FIG. 5, the structure of the right half portion of the replaceable plug is identical to the structure of the adaptor or receptacle, and the structure of the left half portion of the replaceable plug is identical to the structure of the optical fiber connector plug. Therefore, the right half portion can be coupled to the optical fiber connector plug, whereas the left half portion thereof can be coupled to the adaptor or receptacle. The "receptacle" serves as if an electrical socket installed at a wall surface. Therefore, if the term "receptacle" is used, the coupling portion is held stationarily. On the other hand, if the term "adaptor" is used, the coupling portion is movable like a line to line connection.

If the end portion of the independent ferrule housed in the replaceable plug unit is injured, the entire replaceable plug is exchanged by a new one, so that prompt optical connection results.

More specifically, as shown in FIG. 5, the independent ferrule 1 is supported in a housing 20. The housing 20 includes a fastening nut 23 in which a hole is formed. The sleeve 15 is fitted in the hole of the fastening nut 23 so as to fit with a stem portion of the independent ferrule 1 as shown. Between the one end portion of the sleeve 15 and the open end portion of the fastening nut 23 a press-fit member 25 is disposed. In FIG. 5, an axial projection 23a is provided at a left end portion of the fastening nut 23 adapted to be engaged with an axial groove S'(FIG. 7) formed at an outer peripheral surface of a collar portion S of the independent ferrule 1. The engagement between the projection 23a and the groove S' serves as a guide when the stem portion of the independent ferrule 1 is brought into fitting engagement with the sleeve 15. Further, the left end portion of the fastening nut 23 is formed with a thread 23b at its outer peripheral surface so as to engage internal thread 29a formed in a sleeve member 29. The internal surface of the sleeve member 29 is further provided with an annular projection 29b adapted to abut against a planner surface of the collar portion S and support the same in position. On the outer peripheral surface of the sleeve member 29, a second annular projection 29c is provided, and a washer 27 is disposed at a position immediate by beside the projection 29c. A coupling nut 26 is loosely disposed over the sleeve member 29. The coupling nut 26 has an internal bore at which an annular projection 26a is provided. The projection 26a is abuttable on the projection 29c through the washer 27, so that release of the nut 26 out of the sleeve member 29 can be prevented. The internal bore of the coupling nut 26 is also formed with a thread 26c to engage a thread of an adaptor or a receptacle or other replaceable plug unit. The fastening nut 23 is also formed wtih a thread 23c with which a thread of an optical connector plug or other replaceable plug is engageable. Further, a position adjuster member 28 is disposed over the sleeve member 29. This position adjuster can provide position adjustment with respect to opposing coupling member such as the adaptor or receptacle. If the replaceable plug unit is coupled to the other replaceable plug unit, the position adjuster 28 is engageable with an axial slit 23d formed at the opposing replaceable plug (not shown in FIG. 5). If required, an adhesive agent is applied at the interface between the threads 23b and 29a.

Figure 6:
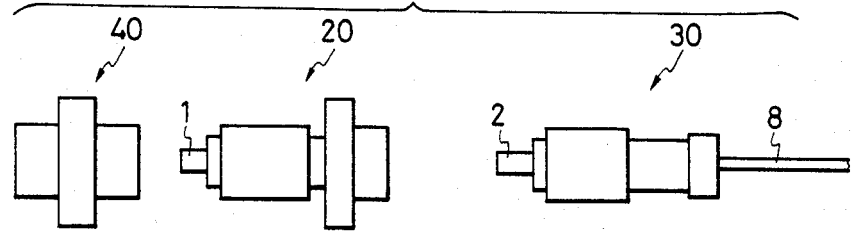
FIG. 6 is a schematic illustration showing a method of using such replaceable optical plug between an optical fiber connecting plug and a plug adaptor.

FIG. 6 shows a method of using the replaceable plug unit according to the present invention. In FIG. 6, the replaceable plug 20 is used between the adaptor 40 and the optical connector plug 30. Reference numerals 2 and 8 designate a stem pf the end ferrule and coated optical fiber, respectively.

Figure 7:
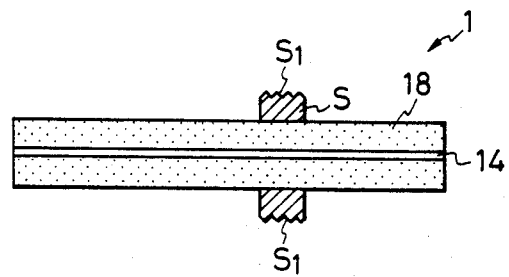
FIG. 7 is a cross-sectional view showing a third embodiment of an independent optical ferrule for use in the replaceable optical plug.

FIG. 7 shows the independent ferrule 2 used in the replaceable plug unit 20. As shown, the collar S is formed with the axial groove S' to engage the axial projection 23a. The optical fiber 14 is held in a position by a ceramic material 18 which constitutes the stem portion.

Figure 8A:
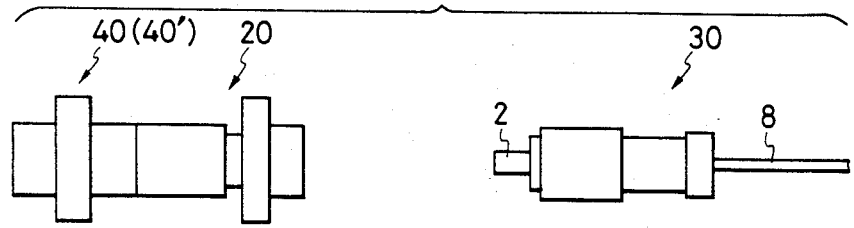
FIG. 8(a) is a schematic illustration showing a method of using the replaceable optical plug which is previously connected to an adaptor or an input end of an optical equipment.

FIG. 8(a) shows another method of using the replaceable plug unit according to the present invention. In this method, the replaceable plug 20 is coupled to an adaptor 40 or a receptacle 40', and thereafter, the optical connector plug 30 is coupled to the replaceable plug 20. This method is advantageous in that the ferrule or light receiving element, light emitting element or condenser lens installed in the stationary optical equipment are protected by the replaceable plug 20. Generally, if these optical elements are injured inside the optical equipment due to repeated coupling operation, it would be extremely difficult to replace these elements with new one. Therefore, the replaceable plug 20 is coupled beforehand to the receptacle 40'. With this structure, the independent ferrule 1 in the replaceable plug 20 is only damaged due to the connection and disconnection works. In such case, only the replaceable plug 20 is replaced with a new one, thereby providing prompt reoperation of coupling.

Figure 8B:
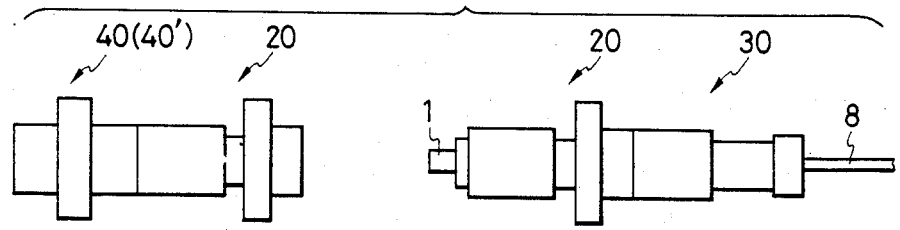
FIG. 8(b) is a schematic illustration showing a method of using the replaceable optical plugs which are respectively connected to optical fiber connecting plug and an adaptor, and these confronting replaceable optical plugs are connected with each other.

Further, as shown in FIG. 8(b), another replaceable plug 20 is also coupled to the optical connector plug 30 beforehand. Thereafter, optical coupling is attained by the direct coupling between two replaceable plugs 20. In this case, the end surface of the end ferrule 2 in the optical conenctor plug 30 is also protected.

Further, in the replaceable plug unit 20, only the independent ferrule 1 can be exchanged by a new one. In this case an adhesive agent should not be applied to the interface between the threads 23b and 29a. To achieve such replacement, the sleeve portion 29 is disengaged from the fastening nut 23, and injured ferrule 1 is removed from the sleeve 15. A new independent ferrule 1 is inserted into the sleeve 15 aligning the projection 23a and the groove S'. Upon complete insertion of the independent ferrule 1 into the sleeve 15, the sleeve member 29 is engaged with the fastening nut 23 until the annular projection 29b abuts the end surface of the collar S.

Examples in accordance with the present invention will be described.

EXAMPLE 1

A single optical fiber having multi-mode function was used, and the optical fiber connecting plug shown in FIG. 2(a) was prepared. The connecting plug was provided with the independent ferrule 1 according to the present invention. As described above, one end of the independent ferrule 1 was in surface contact with the end surface of the end ferrule 2, and these two ferrules were aligned with each other upon inserting these into the sleeve 15. An outer diameter of the surface contact portion of the independent ferrule was 2.5 mm, and axial length of the independent ferrule was 20 mm. The independent ferrule shown in FIG. 3 was used. The outer peripheral surface of the stem portion was provided with a metal pipe, and the stem portion was formed of epoxy resin. An optial fiber was extended at central axis of the independent ferrule 1. Both fiber ends were substantially flush with the plannar ends of the ferrule 1. The optical fiber connecting plug had an outer diameter of 10 mm, and axial length of 45 mm. Two connecting plugs were prepared and these two were inserted into the sleeve 10 of the adaptor 9 in opposite directions. The clamping nut 6 was then engaged with the thread formed at the outer surface of the adaptor housing.

With this structure, coupling loss at the independent ferrule was 0.48 dB as an average of 20 times measurement. Further, the coupling loss measured through the independent ferrule and the end ferrule was about 1.5 dB as an average. Furthermore, in the case where a matching agent was applied between the ends of independent ferrules and end ferrule, the average total coupling loss was 0.85 dB. Furthermore, it has been confirmed that the total loss was 0.52 dB in avarage in the case where all three coupling portions were made through optical contact.

For testing the coupling reliability, vibration tests in two directions were conducted under the condition of amplitude of plus minus 2 mm, 20 Hz for 10 hours. The loss variation was in a range of plus or minus 0.02 dB. Further, a heat cycle test under the condition of −30° C. to +70° C. for 100 hours was conducted. Loss variation was in a range of plus a minus 0.1 dB which was considered to be a sufficient range in this technical field. Furthermore, in order to examine the extent of damage of the coupling surfaces at the independent and end ferrules in an impact test, these ferrules were dropped from a height of 1 m onto a floor. The result of the test for the five samples was sufficient and the variation in coupling loss were all within 0.05 dB.

Next, the independent ferrule was replaced by a new one on an assumption that the independent ferrule was injured, so that the period for the replacement and the coupling loss change were tested. The test was made using the connector structure shown in FIG. 2(a). As a result, the time required for the replacement was about 33 seconds in an average of 10 measurements, and replacing operations at all measurements were completed within one minute. The variations in coupling loss before and after the replacement were within plus or minus 0.1 dB. This data is deemed sufficient in actual practice.

Incidentally, according to the embodiment shown in FIG. 3, a metal pipe 11 is used in the independent ferrule 1. However, the ferrule can be made of ceramic material as shown at 16 in FIG. 4, or be made of plastic material or metallic material only. As for the optical fiber embedded in the independent ferrule, a part of the fiber is formed in a coated optical fiber as shown in FIG. 3. Alternatively, as shown in FIG. 4, a bare optical fiber along its entire length can be used.

EXAMPLE 2

A replaceable optical plug having a structure shown in FIG. 5 was prepared. The ferrule 1 was made from all ceramic material, and was formed with an axial bore having an inner diameter of 0.126 mm at substantially radial center within an eccentric range of 0.5 micrometers. A single mode optical fiber having an outer diameter of 0.125 mm and a core diameter of 10 micrometers was prepared, and the fiber was inserted in the axial bore and was then fixed thereto with an adhesive. Thereafter, both ends of the fiber were polished. A split sleeve was used as the collar portion was made from stainless steel. A sleeve 15 in the replaceable plug housing. Axial length of the replaceable plug was about 22 mm and maximum outer diameter thereof was 11 mm. The independent ferrule 1 had an outer diameter of 2.499 mm. Both axial end portions of the replaceable plug were formed with threads (M8 standard). One end portion of the replaceable plug had a shape identical with the adaptor, and the other end portion thereof had a shape identical with the optical fiber connecting plug as described above.

Coupling loss in the connection mode shown in FIG. 5 was evaluated. The test was carried out by using a single mode optical fiber at the wavelength =1.3 micronmeters. There was two coupling surfaces, and one of the coupling surfaces between the adaptor and the replaceable optical plug was supplied with matching oil in order to eliminate Fresnel loss at this portion. An average coupling loss was about 0.68 dB and the variations in coupling loss attendant to the repetition of connection and disconnection were within plus or minus 0.2 dB for the 20 samples. Thus, it has been found that the embodiment according to the present invention provides low and stable coupling loss, so that there is no problem in actual practice.

With respect to the variation of coupling loss due to ambient temperature change, such samples were tested under temperature conditions changing from −30° C. to +70° C. Variations in coupling loss were all within 0.2 dB. Therefore, it has been found that there is no remarkable defect due to the increase in coupling portion caused by the use of the replaceable plug. Further, as a result of measurements, it was confirmed that for the replacement and recovery of the replaceable plug, it takes only 30 seconds at most. Therefore, even if the independent ferrule in the replaceable plug is subjected to damage, recovery work can be promptly carried out.

Incidentally, the replaceable plug housing according to the embodiment shown in FIG. 5 is constituted by the sleeve member 29, fastening nut 23, press-fit member 25 and sleeve 15. However various modifications can be made without departing from the spirit of the invention. Further, the end portions of the replaceable plug are formed with threads (M8 standard, for example) as at 23c and 26c. However, other type of engaging structure can be applied, such as push-on type engagement wherein resilient deformation of a claw member is utilized. With regard to the independent ferrule, it is made of a material selected from ceramic material, plastic material, glass, and metal; those being capable of forming the central axial bore. In this case, it is preferable to select a material having hardness equal to or lower than that of the material of the end ferrule 2, since one of the objects of the present invention resides in protection of the end surface of the end ferrule. This purpose is attained by rendering the end surface of the independent ferrule 1 being injured prior to the injury of the end surface of the end ferrule 2. For example, if the end stem portion of the end ferrule 2 is made of ceramic material, the material of the independent ferrule may be plastic material. Further, matching oil is not necessarily required at the end face of the independent ferrule, and alternatively, optical contact may be used at the coupling portion.

In view of the foregoing, according to the present invention, various effects and advantages are provided. In the present invention, by the employment of the optical fiber connecting plug incorporating the independent ferrule, only the replacement of the independent ferrule can cope with recovery of optical coupling in case of the injury of the ferrule. In other words, it is possible to effectively realize the protection of the end ferrule which is hardly replaceable due to integral connection between the external optical fiber and the ferrule, and due to polishing the ferrule end, and reassembly of the end ferrule. Therefore, prompt repair work can be attained in the prsent invention.

Further, in the conventional optical fiber connecting plug, a part of the length of the external optical fiber is consumed for the replacement of the end ferrule, since for the replacement, the external fiber is obliged to be cut. On the other hand, according to the present invention, only the replacement of the independent ferrule can provide recovery of optical coupling without reducing the legth of the external optical fiber.

Furthermore, conventionally, it was necessary to check end surface of the ferrule after end polishing at the actual spot. In contrast, in the present invention, the independent ferrule can be examined and checked in a factory, and accordingly, workability can be improved.

Further, in the present invention, the replaceable plug is provided, so that it is possible to effectively realize the protection for a ferrule in an apparatus, a light emission element, light receiving element, a ferrule in an optical plug socket, etc, those being installed in inside of complicated device or inside of a wall. It is extremely difficult to replace such elements by a new one. Owing to the employment of the replaceable plug, injury of such internal elements can be prevented, since the replaceable plug plays a part of coupling work.

While the invention has been described in detail and with reference to specific embodiments thereof, it will be apparent to one skilled in the art that various changes and modifications can be made therein without departing from the spirit and scope of the invention.

What is claimed is:

1. An independent optical ferrule for use in an optical coupling to optical elements comprising:
   a stem portion having first and second end surfaces each confronting ones of said optical elements for providing optical coupling; and,
   at least one optical fiber extending in axial direction of said stem, said optical fiber being held in a fixed position in said stem, both ends of said optical fiber being at the positions of said first and second end surfaces, said first and second end surfaces being free from mechanically integral connection to said optical elements.

2. The independent optical ferrule as claimed in claim 1, further comprising a collar member disposed over said stem portion.

3. The independent optical ferrule as claimed in claim 1, further comprising a metal pipe disposed over said stem portion.

4. The independent optical ferrule as claimed in claim 1, wherein said stem portion has a hardness equal to or lower than that of said optical element.

5. The independent optical ferrule as claimed in claim 1, wherein said stem portion is formed of ceramic material.

6. The independent optical ferrule as claimed in claim 1, wherein said stem portion is formed of plastic material.

7. The independent optical ferrule as claimed in claim 1, wherein said stem portion is formed of glass material.

8. The independent optical ferrule as claimed in claim 1, wherein said optical fiber is a bare optical fiber.

9. The independent optical ferrule as claimed in claim 1, wherein said optical fiber is a coated optical fiber formed with a coating over a bare glass fiber, said coating being removed at both end portions.

10. The independent optical ferrule as claimed in claim 2, wherein said collar member is disposed at longitudinal center portion of said stem portion.

11. The independent optical ferrule as claimed in claim 2, wherein said collar member is disposed offset from longitudinal center portion of said stem portion.

12. The independent optical ferrule as claimed in claim 9 or 10, wherein an axial groove is formed in a peripheral surface of said collar member.

13. An optical fiber connector including an optical connecting plug providing optical coupling between optical elements, comprising:
   at least one independent optical ferrule;
   a plug housing; and
   an end ferrule having one end fixedly connected to one of said optical elements; said end ferrule being disposed in said plug housing, and said at least one independent ferrule being detachably disposed in said plug housing, said independent ferrule being disposed in said housing in axial alignment with said end ferrule, and having one end in surface contact with the other end of said end ferrule, said at least one independent ferrule having the other end in contact with another optical element, and wherein said at least one independent ferrule comprises a stem portion having first and second end surfaces, at least one optical fiber extending axially of said stem, booth ends of said optical fiber being at positions of said first and second end surfaces and said first and second end surfaces being free from mechanical integral connection to said optical elements.

14. The optical fiber connector as claimed in claim 13, wherein said at least one independent ferrule comprises a collar disposed over said stem portion.

15. The optical fiber connector as claimed in claim 13, wherein a plurality of independent ferrules are detachably disposed in said plug housing so as to provide a plurality of optical couplings.

16. The optical fiber connector as claimed in claim 13, wherein said housing comprises; a press ring, at least one intermediate ring, and an insertion guide, said intermediate ring receiving said other end portion of said end ferrule and said intermediate guide also receiving said one end portion of said independent ferrule, said other end of said at least one independent ferrule protruding out of said housing for coupling to another optical element.

17. The optical fiber connector as claimed in claim 16, wherein said another optical element is an another optical fiber connector, and said connector further comprises an adaptor making an optical connection between said at least one independent ferrule and said another optical fiber.

18. The optical fiber connector as claimed in claim 13, wherein said at least one independent optical fiber includes a plurality of optical fibers embedded therein to provide a plurality of optical line connections to a plurality of optical elements.

19. The optical fiber connector as claimed in claim 16, wherein said press ring is threadingly engaged with said intermediate ring, and said intermediate ring is threadingly engaged with said insertion guide.

20. The optical fiber connector as claimed in claim 16, further comprising a sleeve disposed inside of said intermediate ring, said one end portion of said at least one independent ferrule and said other end portion of said end ferrule being inserted into said sleeve.

21. The optical fiber connector as claimed in claim 15, further comprising a clamping nut loosely disposed over said housing, and said clamping nut engaging said adaptor.

22. A replaceable optical plug unit for coupling to optical elements such as optical fiber connector, comprising:
an independent optical fiber, said independent optical fiber comprising a stem portion having first and second end surfaces each confronting one of said optical elements for providing optical coupling; and, at least one optical fiber extending in the axial direction of said stem, said optical fibers being held in a fixed position in said stem, both ends of said optical fiber being at positions of said first and second end surfaces, said first and second end surfaces being free from mechanically integral connection to said optical elements, and
a unit housing internally supporting said independent optical ferrule.

23. The replaceable optical plug unit as claimed in claim 22, wherein said optical elements are an optical fiber connecting plug and an adaptor, and said optical plug unit having one end portion identical to said adaptor, and having another end portion identical to said optical fiber connecting plug.

24. The replaceable optical plug unit as claimed in claim 22, wherein said optical elements are an optical fiber connecting plug and a receptacle, said optical plug unit having one end portion identical to said receptacle, and having another end portion identical to said optical fiber connecting plug.

25. The replaceable optical plug unit as claimed in claim 22, wherein said independent optical ferrule comprises, a stem portion having first and second end surfaces each confronting ones of said optical elements, at least one optical fiber extending axially of said stem, both ends of said optical fibers being at positions of said first and second end surfaces, and being held in a fixed position in said stem, said first and second end surfaces being free from any mechanical integral connection with said optical elements, and a collar member disposed over said stemm portion, said collar member being abutted on an internal portion of said housing unit to fix the position of said independent ferrule upon assembly.

26. The replaceable optical plug unit as claimed in claim 22, wherein said independent ferrule is fixedly secured to said unit housing.

27. The replaceable optical plug unit as claimed in claim 22, wherein said independent ferrule is detachably disposed in said unit housing.

28. The replaceable optical plug unit as claimed in claim 22, wherein said unit housing comprises, a fastening nut and a sleeve member engageable with said fastening nut, said fastening nut and said sleeve member being formed with bores through which said independent ferrule extends.

29. A replaceable plug unit as claimed in claim 28, wherein said fastening nut has one end portion provided with a thread, and the other end portion provided with a thread, an end of said other end portion of said fastening nut being formed with an axial projection, and wherein said sleeve member has one end portion formed with a thread engaging a thread of said other end portion of said fastening nut, said bore of said sleeve member being formed with an annular projection abutting said collar of said independent ferrule.

30. The replaceable plug unit as claimed in claim 29, wherein said collar of said independent ferrule is formed with an axial groove to engage said axial projection of said fastening nut.

31. A method of using a replaceable plug unit which comprises an independent optical ferrule and a plug unit housing supporting said independent optical ferrule, said optical ferrule effecting optical coupling to optical elements, and wherein said independent optical ferrule comprises: a stem portion having first and second end surfaces each confronting one of said optical elements for providing optical coupling; and at least one optical fiber extending axially of said stem, said optical fiber being held in a fixed position in said stem, both ends of said optical fiber being at positions of said first and second end surfaces, said first and second end surfaces being free from mechanically integral connection to said optical elements; and said method comprising the steps of; coupling said replaceable plug unit with an adaptor; and coupling an optical fiber connecting plug to said replaceable plug unit.

32. A method of using a replaceable plug unit which comprises an independent optical and a plug unit housing supporting said independent ferrule, said independent optical ferrule being employed in optical coupling of optical elements and comprising; a stem portion having first and second end surfaces each confronting one of said optical elements for providing optical coupling; and at least one optical fiber extending axially of said stem, said optical fiber being held in a fixed position in said stem, both ends of said optical fiber being the positions of said first and second end surfaces, said first and second end surfaces being free from mechanically integral connection to said optical elements; and said method comprising the steps of:
coupling at least one first replaceable plug unit to an adaptor or a receptacle;
coupling at least one second replaceable plug unit to an optical fiber connecting plug; and,
coupling said first and second replaceable plugs together.

33. The method of claims 31 or 32, wherein said independent optical ferrule has hardness lower than that of an end ferrule housed in said optical fiber connecting plug.

* * * * *